No. 610,740. Patented Sept. 13, 1898.
T. GUILLEAUME.
MANUFACTURE OF FLEXIBLE METALLIC TUBES, &c.

(Application filed Nov. 6, 1897.)

(No Model.)

Witnesses.
Georg Müller
Hermann Oelert

Inventor.
Theodore Guilleaume

UNITED STATES PATENT OFFICE.

THEODORE GUILLEAUME, OF MÜLHEIM-ON-THE-RHINE, GERMANY.

MANUFACTURE OF FLEXIBLE METALLIC TUBES, &c.

SPECIFICATION forming part of Letters Patent No. 610,740, dated September 13, 1898.

Application filed November 6, 1897. Serial No. 657,720½. (No model.)

*To all whom it may concern:*

Be it known that I, THEODORE GUILLEAUME, a subject of the German Emperor, residing at Mülheim-on-the-Rhine, in the German Empire, have invented new and useful Improvements in the Manufacture of Flexible Metallic Tubes and in Joints Therefor, (in respect whereof I have caused a patent to be applied for in Great Britain to bear date September 27, 1897, No. 22,114,) of which the following is a specification.

This invention relates to the manufacture of tubes composed of one or of several layers of a soft ductile metal—such as lead, copper, or the like—in tubular form and of one or of several layers of wire arranged so as to form a tube, such wires being of any desired shape, but preferably of such a section as to insure their interlocking, so as to form a closed layer, and being laid up in long spirals similar to the wires of a rope. These wires may be composed of hard metal, such as iron, steel, or the like; but any other suitable metal may be used, according to the purpose for which the tube is intended.

In the production of tubes according to this invention soft metal may be employed for the inner layer, while the outer layer may be composed of hard wire, or the latter may be disposed inwardly and the layer of soft metal outwardly. More than two layers may, however, be employed—as, for example, several layers of soft metal disposed inwardly and one or several layers of wire disposed outwardly, or the layers of soft metal and of wire may be arranged alternately.

Figure 3:
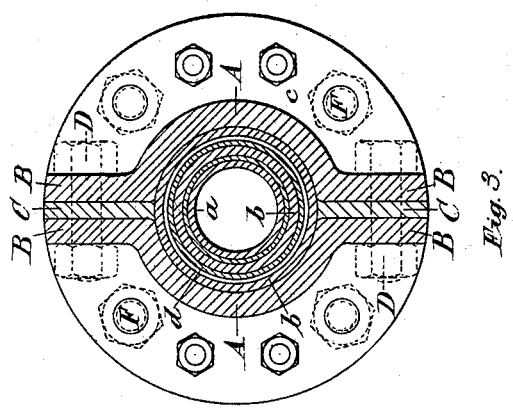
Figure 1:
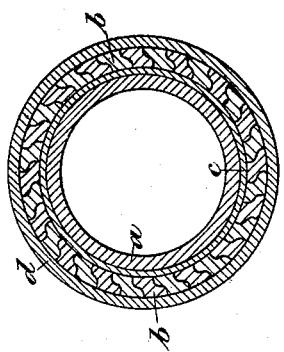
Figure 2:
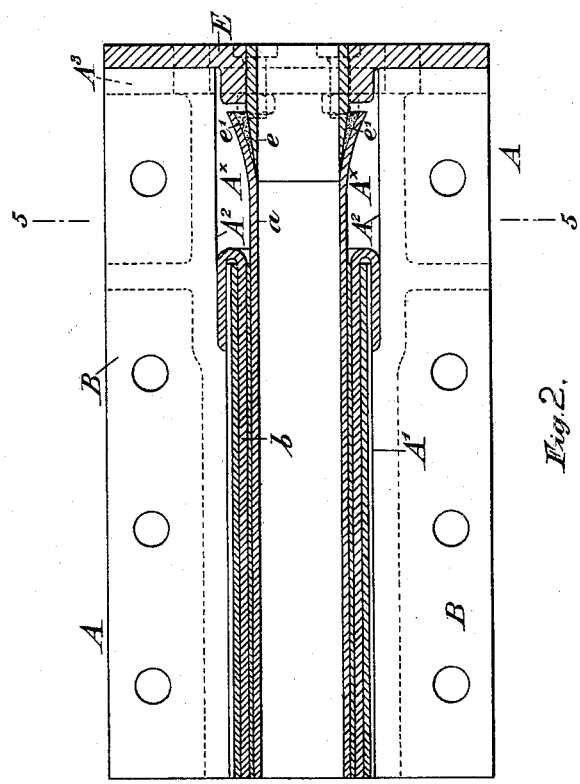

In the accompanying drawings, Figure 1 is a transverse section of a flexible tube wherein the outer layer is composed of interlocked wires. Fig. 2 is an elevation of the interior of one half of the joint, showing its application to the flexible tube. Fig. 3 is a transverse section on the line 5 5 in Fig. 2.

According to the mode of construction illustrated the inner tube-layer $a$ is composed of soft metal, while the outer tube-layer is formed of interlocked wires $b\ b$. A filling $c$ of fibrous material—such as hemp, jute, cotton, or the like—may be laid between the inner and outer layers with a view to preventing contact between the two portions. As a protection against injury from atmospheric influences, moisture, or other causes the outer tube $b$ may also be served with a covering $d$ of fibrous material.

Compound tubes of the character herein described may be manufactured in great lengths, according to the diameter required, so that only very few joints are rendered necessary. They are, moreover, capable of withstanding much greater pressure than ordinary soft-metal tubes of equal diameter and thickness of wall. They may be coiled like ropes and may be laid in the earth or under water. Several of such compound tubes may be laid together to form a strand, and several such strands may be laid up to form a cable.

A joint-piece specially adapted for use with compound tubes of the kind above referred to and capable of affording a good connection is illustrated in Figs. 2 and 3 and consists of a circular case or shell A, divided longitudinally into two parts and provided with longitudinal flanges B for uniting the two parts together, packing C being interposed between the flanges B B, which are drawn together by means of bolts or screws D. The bore or interior A' of the shell A, which incloses the compound tube, is enlarged or flared at $A^2$, the exterior being provided with an outwardly-projecting flange $A^3$. The compound tube having been introduced into one half of the shell the outer tube-layer $b$ is turned or laid back so as to fill the enlarged or flared portion $A^2$ of the shell. Against the flange $A^3$, at the outer end of the flared portion, is placed a ring or flanged casting E, carrying a tube $e$, of hard metal, whereof the free end is reduced to a fine edge. This tube enters the shell and impinges against the inner surface of the flared end of the inner tube-layer $a$, the space $e'$ between the hard-metal tube $e$ and the inner tube-layer being filled with solder. The space $A^×$ which occurs between the enlarged portion of the shell and the exterior of the inner tube may be filled with asphaltum or the like. Having thus adjusted the compound tube the other half of the shell is applied and the two parts are fastened together by means of the bolts or screws D D, which pass through the coinciding flanges B B. The end of the length which is to be connected is similarly fitted in a corresponding joint-piece and the two joint-pieces are secured together by means of bolts or screws at F F. Packing of any suitable kind may, if desired, be interposed between the flanges of the two joint-pieces.

What I claim as my invention, and desire to secure my Letters Patent, is—

1. A flexible metallic tube comprising one or more tubes of soft ductile metal and, concentric therewith, one or more tubes of hard metal composed of a number of wires laid up in long spirals similar to the wires of a rope, substantially as herein described.

2. A flexible metallic tube consisting of an inner tube of soft metal and, concentric therewith, an outer tube composed of wires of hard metal arranged to interlock with one another and to form a closed layer, substantially as herein described.

3. In a flexible metallic tube, the combination, with a soft-metal tube $a$ and a hard-metal tubular layer of wires $b$ of an intermediate layer $c$ of fibrous material, substantially as and for the purposes set forth.

4. In a flexible metallic tube, the combination, with a soft-metal tube $a$ and a hard-metal tubular layer of wires $b$ of an intermediate layer $c$ of fibrous material and an outer protective covering $d$ of similar material, substantially as and for the purposes set forth.

5. For joining flexible metallic tubes of the kind herein referred to, a joint-piece comprising a shell divided longitudinally and having a bore enlarged at one end, for the reception of the turned-back portion of the outer layer of the tube, a sharp-edged tube inserted in said enlarged part of the bore, and to which the extremity of the inner layer of the soft-metal tube is soldered, means for uniting the two halves of the shell, same consisting of bolts which pass through longitudinal flanges formed on each half-shell, and means for securing the sharp-edged tube in position, said tube being carried by a flanged casting which is bolted to the end flange of the shell, substantially as set forth.

THEODORE GUILLEAUME.

Witnesses:
   HEIN. MAFFERT.
   WILLIAM H. MADDEN.